United States Patent
Chae et al.

(10) Patent No.: US 10,976,715 B2
(45) Date of Patent: Apr. 13, 2021

(54) ARTIFICIAL INTELLIGENCE DEVICE MOUNTED ON WINE REFRIGERATOR

(71) Applicant: LG Electronics Inc., Seoul (KR)

(72) Inventors: Seungah Chae, Seoul (KR); Hyoeun Kim, Seoul (KR); Suyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/574,692

(22) Filed: Sep. 18, 2019

(65) Prior Publication Data

US 2020/0012247 A1    Jan. 9, 2020

(30) Foreign Application Priority Data

Jul. 22, 2019    (KR) .................. 10-2019-0088610

(51) Int. Cl.
*G06K 9/00* (2006.01)
*G05B 19/042* (2006.01)
*G06N 3/08* (2006.01)

(52) U.S. Cl.
CPC .............. *G05B 19/042* (2013.01); *G06N 3/08* (2013.01); *G05B 2219/2654* (2013.01)

(58) Field of Classification Search
None
See application file for complete search history.

(56) References Cited

U.S. PATENT DOCUMENTS

2019/0154313 A1* 5/2019 Verellen .................. F25D 29/00
2020/0214474 A1* 7/2020 Ryu ....................... F25D 31/007

* cited by examiner

*Primary Examiner* — Atiba O Fitzpatrick
(74) *Attorney, Agent, or Firm* — Fish & Richardson P.C.

(57) ABSTRACT

An artificial intelligence device mounted on a wine refrigerator including one or more divided spaces includes an input unit, a processor, and an output unit. The input unit is configured to recognize a wine label of each space and recognize an image for determining opening or non-opening of a wine. The processor is configured to acquire wine information by using an artificial intelligence model that receives image data acquired from the input unit as an input value, create a wine list table of each space by using the acquired information, and group wines having the same storage condition into at least one group according to the wine list table, and perform a control such that a temperature of each space is set based on the storage condition of the group. The output unit is configured to output a signal received from the processor.

18 Claims, 8 Drawing Sheets

RECOGNIZE WINE FOR EACH SPACE

DETERMINE WINE IN SPACE (S410)

| REFRIGERATOR COMPARTMENT | WINE NAME | WINE TYPE | STORAGE START DATE | OPENED DATE |
|---|---|---|---|---|
| FIRST COMPARTMENT | Chardonnay Viognier Notre Dame de Cousignac 2013 | WHITE WINE | 2019.5.20 | NONE |
| | ... | WHITE WINE | | NONE |

CREATE WINE LIST TABLE (S420)

GROUP (S430) AND CONFIRM PLURALITY OF GROUPS (S440)

S420

| REFRIGERATOR COMPARTMENT | WINE NAME | WINE TYPE | STORAGE START DATE | OPENED DATE | APPROPRIATE STORAGE TEMPERATURE |
|---|---|---|---|---|---|
| FIRST FLOOR | Chardonnay Viognier Notre Dame de Cousignac 2013 | WHITE WINE | 2019.5.20 | NONE | 13 ~ 15 |
| | ... | WHITE WINE | | NONE | |
| | ... | WHITE WINE | | NONE | |
| | ... | RED WINE | | NONE | |
| SECOND FLOOR | | | | | |
| | | | | | |
| | | | | | |
| | | | | | |
| ... | ... | ... | ... | ... | |

810

ARTIFICIAL INTELLIGENCE DEVICE MOUNTED ON WINE REFRIGERATOR

CROSS-REFERENCE TO RELATED APPLICATIONS

The present application claims the benefits of priority to Korean Patent Application No. 10-2019-0088610 filed on Jul. 22, 2019, which is herein incorporated by reference in its entirety.

BACKGROUND

The present invention relates to an artificial intelligence device mounted on a wine refrigerator. In particular, an artificial intelligence device mounted on a wine refrigerator including one or more divided spaces identifies label information and opening or non-opening of a wine stored in each space by using an artificial intelligence model, creates a wine list table including information about the wine stored in each space by using the information acquired by using the artificial intelligence model, and sets the temperature of each space of the wine refrigerator by grouping according to the storage conditions of the wine.

The present invention relates to an artificial intelligence device mounted on a wine refrigerator. In particular, in order to store the wine stored in each storage in an optimal storage condition, the wine is recognized for each space, and a notification for optimal wine storage is provided to the user by using an artificial intelligence model.

In general, the demands for wine refrigerators used only for wine dealers have recently been increasing among the general public. Accordingly, wine refrigerators are being launched at reasonable prices, ranging from expensive products to inexpensive products. Recently, refrigerators that allow users to set wine storage conditions according to personal preferences have been released. Due to the characteristics of the wines, the storage temperature is very important to properly enjoy the taste and aroma of the wines. For example, in the case of white wine, it is preferable to adjust a temperature at about 5° C. to about 8° C., and in the case of red wine, it is preferable to adjust a temperature at about 13° C. to about 18° C. When considering that there is an expiration date depending on whether a cork is opened or closed, it is very inconvenient for ordinary persons other than experts to check the type of the wine and the temperature of the refrigerator in order for optimal storage. In addition, existing wine refrigerators have been inconvenient because detailed operations such as a multi-stage temperature control function can be used only after the user is well acquainted with the characteristics of the refrigerator by referring to the manual.

SUMMARY

The present invention has been made in an effort to solve the above-described problems and inconveniences of the related art, and an artificial intelligence device mounted on a wine refrigerator is used to identify label information and opening or non-opening of the wine stored in each space through an artificial intelligence model.

The present invention provides an artificial intelligence device and a method for the same, wherein a processor creates a wine list table including information about wines stored in each space by using information acquired using the artificial intelligence model, performs grouping according to the storage conditions of the wines, and sets the temperature of each space in the wine refrigerator, thereby providing convenience to a general user without expertise.

According to the present invention, an artificial intelligence device mounted on a wine refrigerator including one or more divided spaces includes an input unit configured to recognize a wine label of each space and recognize an image for determining opening or non-opening of a wine, wherein wine information and opening or non-opening are acquired from the image data acquired from the input unit by using an artificial intelligence model.

A processor is configured to create a wine list table stored in each space by using the acquired information, classify and group wines having the same storage condition according to the wine list table, and set an optimal temperature of each space. The output unit is configured to output a notification to informing a user by using a signal received from the processor.

The details of one or more embodiments are set forth in the accompanying drawings and the description below. Other features will be apparent from the description and drawings, and from the claims.

DETAILED DESCRIPTION OF THE EMBODIMENTS

Figure 1:
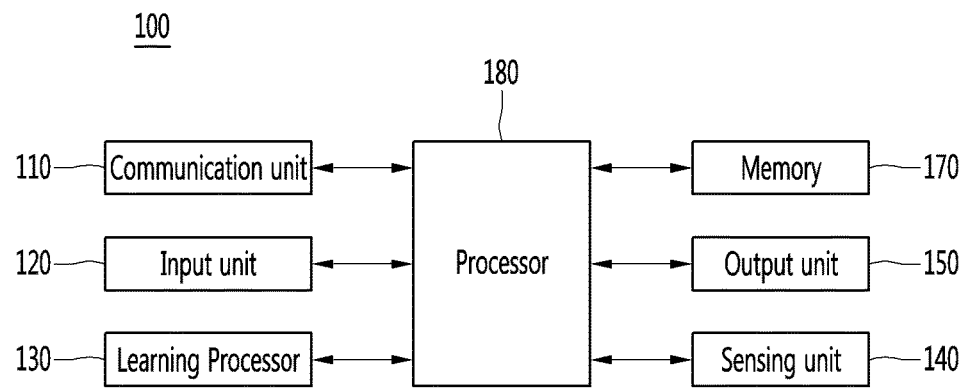
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
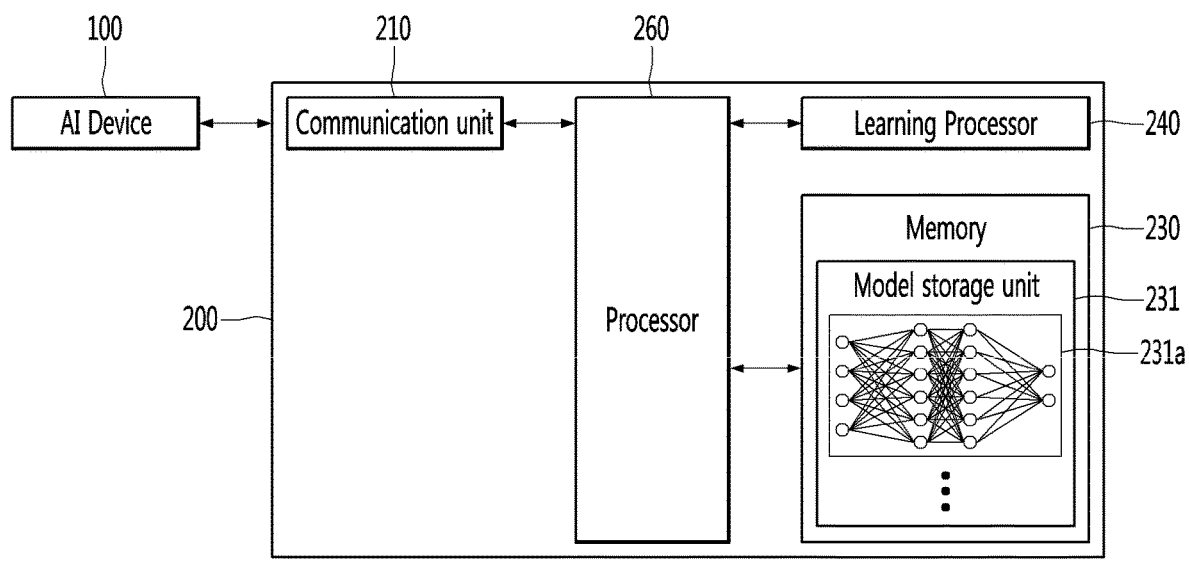
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
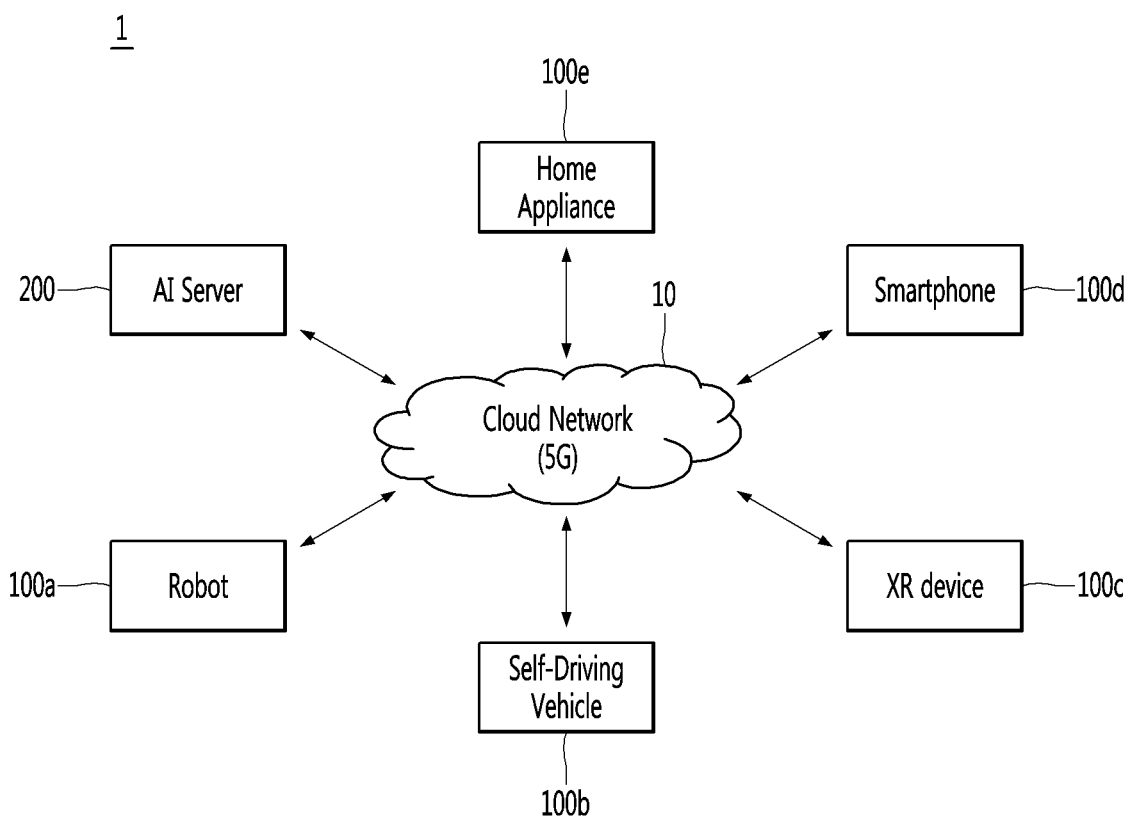
FIG. 3 is a diagram illustrating an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

According to one embodiment of the present invention, an AI device mounted on a wine refrigerator including one or more divided spaces may include: an input unit 120 configured to recognize a wine label of each space and recognize an image for determining opening or non-opening; a processor 180 configured to acquire wine information by using an AI model that receives image data acquired from the input unit 120 as an input value, create a wine list table of each space by using the acquired information, group the wines having the same storage condition into at least one group according to the wine list table, and perform a control such that a temperature of each space is set based on the storage condition of the group; and an output unit 150 configured to output a signal received from the processor 180. Hereinafter, FIG. 4 is described.

Figure 4:
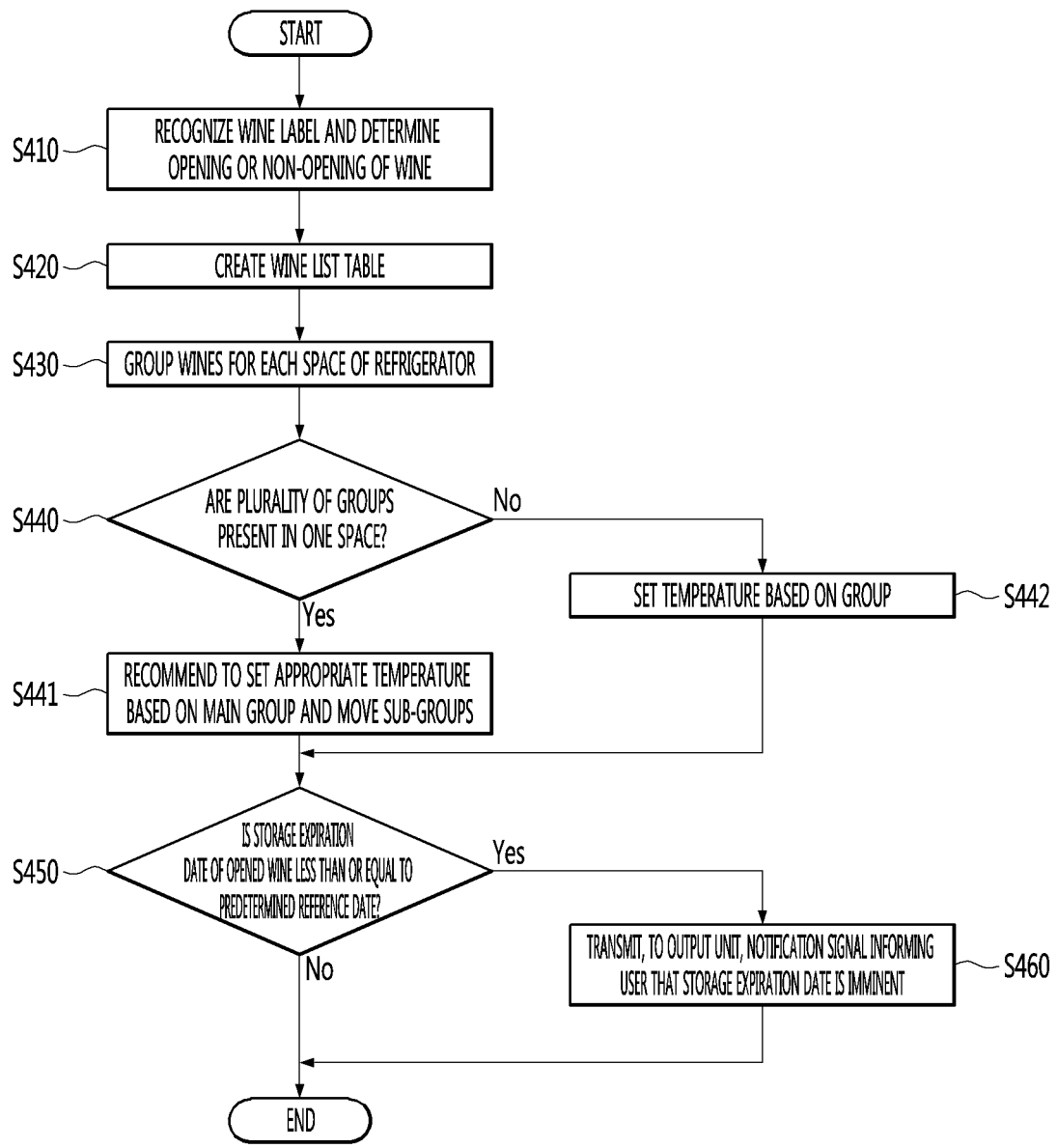
FIG. 4 is an overall flowchart according to an embodiment of the present invention.

FIG. 4 is an overall flowchart according to an embodiment of the present invention.

A description redundant to FIG. 1 will be omitted.

Referring to FIG. 4, the input unit 120 of the AI device 100 recognizes a wine label for each space and recognizes an image for determining whether the wine is opened. The processor 180 uses the acquired image data to recognize the wine label and determine whether the wine is opened (S410). Next, the processor 180 creates a wine list table (S420) and groups wines for each space of the wine refrigerator (S430).

The processor 180 determines whether a plurality of groups are present in one space as the grouping result (S440). If the plurality of groups are present, the space is set to an appropriate temperature based on the main group and the movement of the remaining groups is recommended (S441).

According to one embodiment of the present invention, if the processor 180 determines that only one group is present in one space as the grouping result, the processor 180 sets a temperature in the space of the wine refrigerator based on the corresponding group (S442).

Next, the processor 180 determines whether there is an opened wine whose storage expiration date is less than or equal to a predetermined reference date (S450). If the processor 180 determines that there is the opened wine whose storage expiration date is less than or equal to the predetermined reference date, the processor 180 transmits a control signal to the output unit 150 so as to output a notification informing the user of the remaining storage days (S460).

Figure 5:
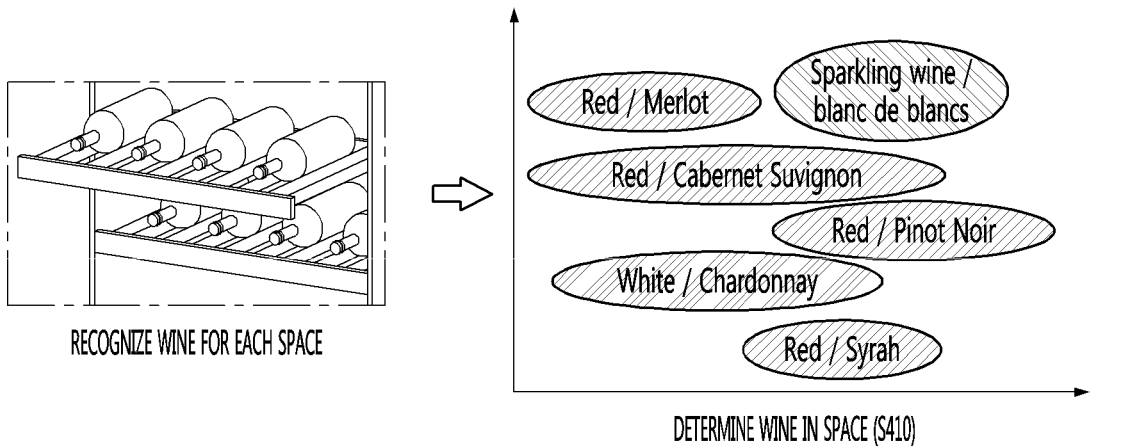
FIG. 5 is an overall flowchart according to an embodiment of the present invention.
Figure 5:
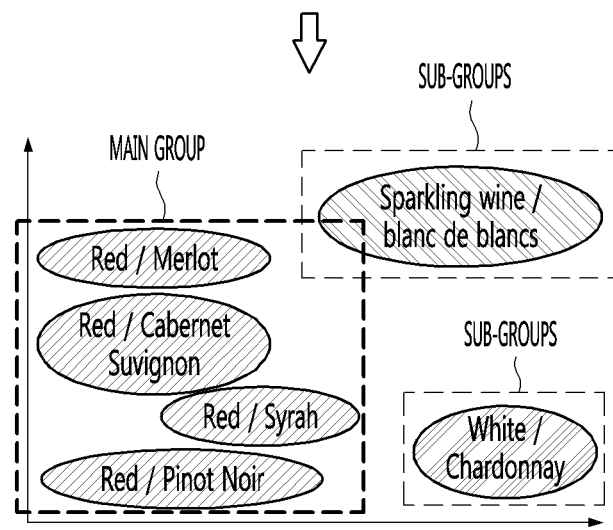

FIG. 5 is an overall flowchart according to an embodiment of the present invention.

A description redundant to FIG. 4 will be omitted.

The input unit 120 acquires image data of wine for each space of the wine refrigerator. The processor 180 determines the wine in the space by using the image data acquired from the input unit 120. The processor 180 creates a wine list table (S420), groups wines based on the same storage condition, determines a main group and a sub-group as the grouping result, and sets a storage condition of the corresponding space of the wine refrigerator.

Each process will be described in detail according to an embodiment of the present invention.

The input unit 120 of the AI device 100 recognizes a wine label for each space and recognizes an image for determining whether the wine is opened. In detail, the input unit 120 may include a camera installed in each space of the wine refrigerator.

The wine image data acquired from the input unit 120 may be a label image attached to the wine. The wine label includes information such as a wine name attached to the wine, a date of manufacture, manufacturing information, a country of manufacture, etc., but the present invention is not limited thereto. In addition, the image for determining whether the wine is opened may be an image of a wine top cap portion (for example, a cork cap portion), and the input image may be stored in the memory 170.

The processor 180 uses the image data acquired from the input unit 120 as an input value of the AI model to recognize the wine label and determine whether the wine is the opened wine. Hereinafter, details will be described with reference to FIGS. 6 and 7.

According to one embodiment of the present invention, the AI model may include network models such as Deep Neural Network (DNN), Recurrent Neural Network (RNN), Bidirectional Recurrent Deep Neural Network (BRDNN), Multilayer Perceptron (MLP), and Convolutional Neural Network (CNN). The AI model may include single-layer neural networks and multi-layer neural networks according to the number of layers. However, the present invention is not limited thereto.

The AI model may be used interchangeably with a deep learning model or an artificial neural network.

The artificial neural network may be trained using training data. The training refers to a process of determining parameters of an artificial neural network using training data so as to achieve the purpose of classifying, regressing, clustering, or the like input data.

In addition, the method for training the AI model may largely include supervised learning, unsupervised learning, semi-supervised learning, and reinforcement learning.

Specifically, the artificial neural network may be an AI model trained in a state in which a label for training data is given.

The label may refer to a correct answer (or a result value) that the artificial neural network should infer when the training data is input to the artificial neural network.

In the present specification, if the training data is input, the correct answer (or the result value) that the artificial neural network should infer is referred to as a label or labeling data.

In addition, in the present specification, setting a label to training data for training the artificial neural network is referred to as labeling the training data.

In this case, the training data and the label corresponding to the training data may constitute one training set, and may be input to the artificial neural network in the form of the training set.

Meanwhile, the training data indicates a plurality of features, and the labeling of the training data may mean that the feature indicated by the training data is labeled. In this case, the training data may represent the characteristics of the input object in the vector form.

The artificial neural network may use the training data and the labeling data to infer the function of the correlation between the training data and the labeling data. Parameters of the artificial neural network may be determined (optimized) by evaluating the function inferred by the artificial neural network.

Figure 6:
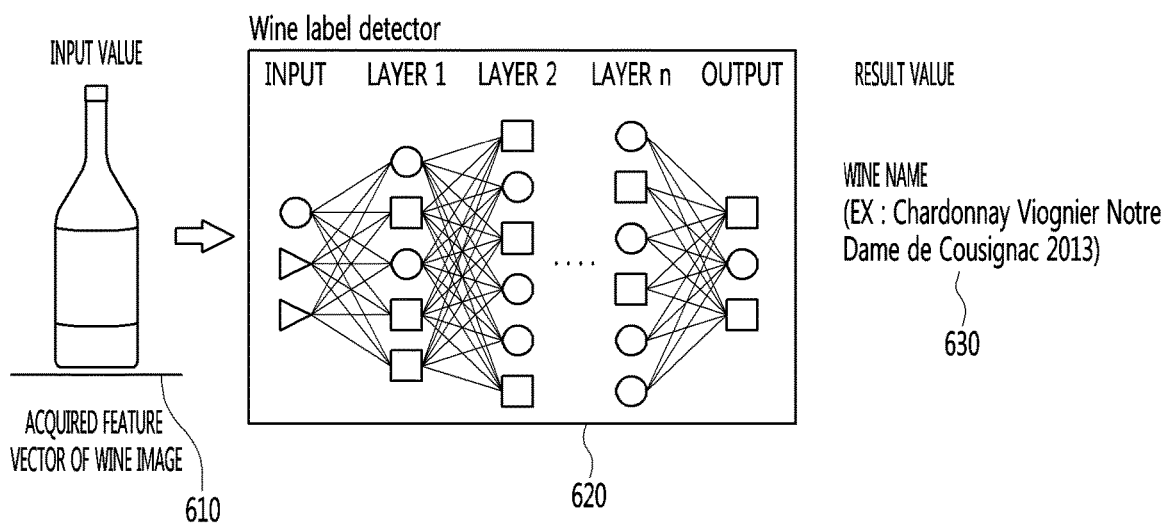
FIG. 6 illustrates an AI model for wine information according to an embodiment of the present invention.

FIG. 6 illustrates an AI model for wine information according to an embodiment of the present invention.

Referring to FIG. 6, the processor 180 of the AI device 100 may extract a feature vector of image data 610 by using wine image data acquired from the input unit 120. The feature vector may be an input value of an AI model.

The AI model is a first AI model 620 that is a neural network whose weight is adjusted by training using the image data 610 acquired from the input unit 120 as an input value and wine information 620 (e.g., wine name) as a result value.

Specifically, the first AI model 620 may be an AI model trained in a state in which a label for training data is given.

The training data represents the feature of the wine image data.

The label may be the wine name as the correct answer or the result value that the artificial neural network should infer when the training data is input to the artificial neural network.

The first AI model may infer the function of the correlation between training data and labeling data by using the wine image data (training data) and the wine name (labeling data). Parameters of the AI model may be determined (optimized) by evaluating the function inferred by the first AI model.

In this case, the processor 180 may use an AI model trained by the learning processor 130 of the AI device 100, and may use an AI model trained by the learning processor 240 of the AI server 200.

Figure 7:
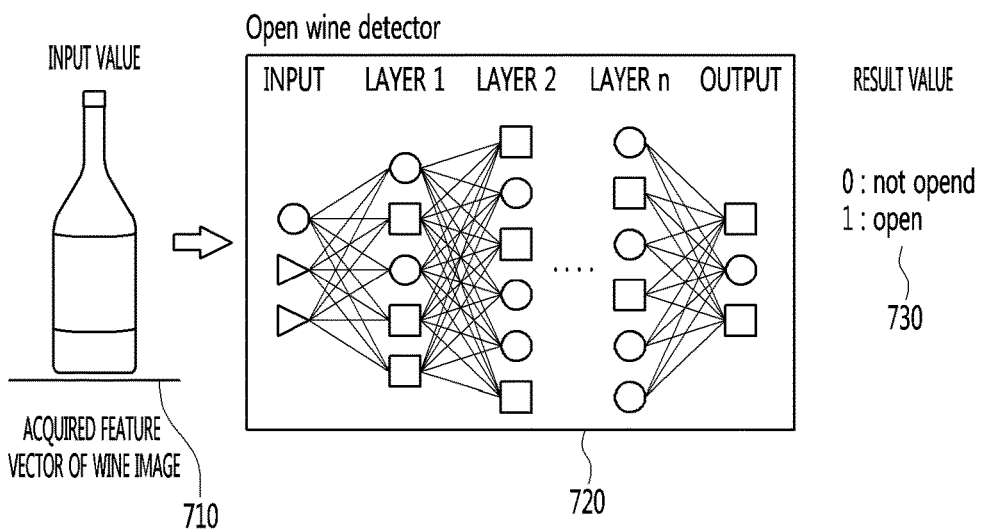
FIG. 7 is a diagram illustrating an AI model for determining opening or non-opening according to an embodiment of the present invention.

FIG. 7 is a diagram illustrating an AI model for determining opening or non-opening according to an embodiment of the present invention.

Referring to FIG. 7, the processor 180 of the AI device 100 may extract a feature vector of image data 710 by using wine image data 710 acquired from the input unit 120. The feature vector may be an input value of an AI model.

The AI model is a second AI model 720 that is a neural network whose weight is adjusted by training using the image data 710 acquired from the input unit 120 as an input value and opening or non-opening of wine as a result value. For example, the result value of the second AI model may be non-opened wine (result value: 0) and opened wine (result value: 1).

Specifically, during the training of the AI model, the training may be performed by labeling information indicating that the wine is opened in the image data of the wine with an opened cork stopper attached thereto. According to another embodiment, the training may be performed by labeling the information of the opened wine in the image data of the wine with a wine stopper attached thereto.

In this case, the processor 180 may use an AI model trained by the learning processor 130 of the AI device 100, and may use an AI model trained by the learning processor 240 of the AI server 200.

Hereinafter, FIG. 4 is described.

The processor 180 creates a wine list table (S420). Hereinafter, details will be described in detail with reference to FIG. 8.

Figures 8, 9:
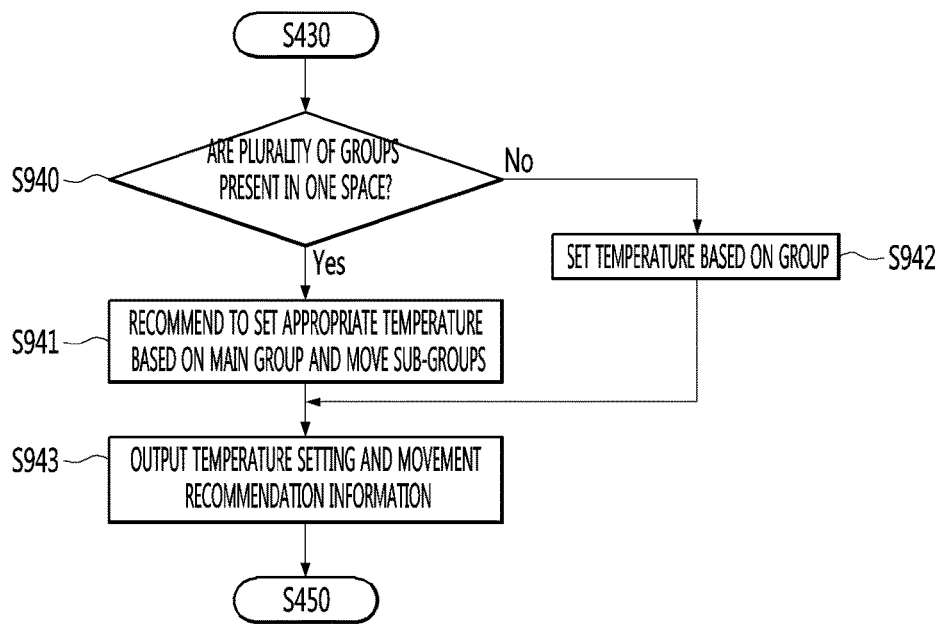
FIG. 8 illustrates a wine list table according to an embodiment of the present invention.
FIG. 9 is a flowchart for displaying the movement recommendation and notification according to wine grouping according to an embodiment of the present invention.

FIG. 8 illustrates a wine list table according to an embodiment of the present invention.

If the processor 180 acquires the wine information as the result value by using the wine image data acquired by the input unit 120 as the input value of the AI model, the processor 180 may create a wine list table 810 of each space based on the acquired wine information.

Specifically, the wine information that is the result value of the AI model may include a wine name described in a wine label.

For example, the wine list table 810 may include a wine name acquired as the result value of the first AI model and the opening or non-opening of the wine acquired as the result value of the second AI model. In addition, the wine list table 810 may include a storage space in the wine refrigerator, a wine type (e.g., white wine, red wine), a storage start date, and an appropriate storage temperature.

In addition, the information about the storage space may be the location of the space where the camera of the input unit 120 is installed. The storage start date may be the time when the wine is recognized by the camera if the wine is not opened, and the processor 180 may add a tag by tagging the storage start date to the wine. If the wine is in the opened state, the processor 180 may check the tag on the wine and acquire the storage start date by reading the information of the previous wine list table including the tagged wine.

For example, as illustrated in FIG. 8, the wine list table may be created by acquiring the wine name (Chardonnay Viognier Notre Dame de Cousignac 2013), which is the result value acquired by the first AI model by using the wine image data (wine label and wine upper image) recognized by the camera installed in the first compartment (first floor) of the wine refrigerator, and the information of the non-opened state, which is the result value acquired by the second AI model. A table indicating that the wine type is white wine, the storage start date is May 20, 2019, and the appropriate storage temperature (13° C. to 15° C.) may be created.

If the wine name is determined, the processor 180 may use the information of the corresponding wine stored in the server or the cloud so as to acquire the remaining information about the wine. In addition, the information may be acquired by using a mapping table previously stored in the memory of the AI device. In addition, the form of the wine list table 810 may be in the form of a table as shown in FIG. 8, but the present invention is not limited thereto. The wine list table 810 may be generated in various methods that can list the information.

If the wine name is determined, the processor 180 may add the tag to the corresponding wine. Then, if the same wine is recognized and the wine is determined as being in the opened state, the processor 180 may read the tag information to acquire the storage start date, and may confirm the storage expiration date.

Hereinafter, FIG. 4 is described.

The processor 180 groups wines for each space of the wine refrigerator based on the wine list table (S430).

In detail, the processor 180 groups the wines having the same storage condition into at least one group according to the wine list table. The same storage condition may include the type and the appropriate storage temperature of the wine.

For example, the processor 180 may group wines within a predetermined error range of the type or the appropriate storage temperature of wine for each storage space according to the wine list table. The predetermined error range may be a value arbitrarily set by the user. It may also include cases where the storage conditions are the same.

Hereinafter, FIG. 4 is described.

The processor 180 may set the appropriate temperature of the corresponding space according to whether a plurality of groups are present in one space as the result of operation S430 (S440 to S442). Hereinafter, details will be described with reference to FIG. 9.

FIG. 9 is a flowchart for displaying the movement recommendation and notification according to wine grouping according to an embodiment of the present invention.

If one group is present in the divided space, the processor 180 may sets the divided space to the appropriate storage temperature of the group (S942) and may control the output unit 150 to output the storage condition information of the corresponding space (S943).

For example, if one group is present as the grouping result of the first floor of the wine refrigerator, the processor 180 may acquire the appropriate storage temperature of the group from the wine list table, set the appropriate storage temperature of the first floor of the wine refrigerator, and control the output unit 150 to output the storage condition information of the corresponding space so as to notify the user.

According to one embodiment of the present invention, if a plurality of groups are present in the divided space, the processor 180 may set the appropriate storage temperature of the main group among the plurality of groups as the temperature of the divided space (S941), and output the output unit 150 to output a notification for moving the remaining groups to another space (S943).

In detail, the main group may be a group having the largest number of wines belonging to each group among the plurality of groups. In addition, the processor 180 may select the main group according to the average price of the wine based on the price of the wine belonging to the plurality of groups, and may select a group, to which a user's favorite wine belongs, as the main group according to the preference. However, the present invention is not limited thereto.

For example, the user may want to store his/her favorite red wine (appropriate storage temperature: 14° C.) in the space of the wine refrigerator that matches his/her eye level. In this case, the user may set the group including his/her favorite red wine (appropriate storage temperature: 14° C.) as the main group. In this case, the processor 180 may group the group including the user's favorite red wine into the main group and group the remaining groups as the subgroup.

According to one embodiment of the present invention, if the number of wines included in the first group among the plurality of groups on the first floor of the wine refrigerator is the largest, the processor 180 may select the first group as the main group, and acquire an appropriate storage temperature of the first group from the wine list table.

Thereafter, the processor 180 may set the first floor of the wine refrigerator to the appropriate storage temperature of the first group. The processor 180 controls the output unit 150 to output a notification for moving to a space other than the first floor with respect to the remaining groups (e.g., the second group and the third group) other than the first group on the first floor of the wine refrigerator, so as to recommend other wine storage spaces to the user.

For example, if the group (sub-group) to which the wine to be moved belongs is not the main group in other spaces, the other wine storage space to be recommended to the user may be an empty space of the wine refrigerator or a space not designated as the main group.

According to one embodiment of the present invention, as a result of recommending the user to provide the notification to the remaining groups (second and third groups), which are not the main group, and to move, if the remaining groups (sub-groups) move to another space, the processor 180 may determine whether a plurality of groups are present in the corresponding space by regrouping the wines included in the spaces to which the remaining groups have moved.

For example, if the second group is moved to the second floor of the wine refrigerator by the user, the processor 180 may regroup wines included in the second floor of the wine refrigerator.

Thereafter, the processor 180 may repeat operations S940 to S943 according to whether the plurality of groups are present on the second floor of the wine refrigerator as the grouping result.

Figure 10:
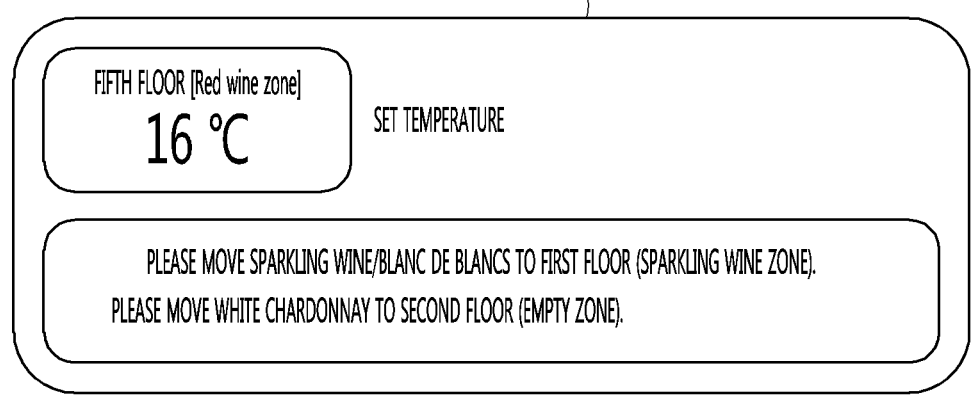
FIG. 10 illustrates a notification display according to an embodiment of the present invention.

FIG. 10 illustrates a notification display according to an embodiment of the present invention.

When it is determined in operations S940 to S942 that the storage condition (e.g., set temperature) and the plurality of groups are present in the space, the processor 180 may transmit a control signal to the output unit 150 so as to output a notification informing the user of the movement recommendation information.

For example, the corresponding space (e.g., the floor of the wine refrigerator) may be displayed at the upper end of the output unit 150, and the temperature setting information may be output therebelow. However, the present invention is not limited thereto. When the plurality of groups are present, the group movement recommendation notification may be output to the user at the lower end of the output unit 150.

Again, FIG. 4 is described.

If the result value of the second AI model is the opened wine, the processor 180 may determine whether there is a wine whose storage expiration date is less than or equal to a predetermined reference date by using the information stored in the wine list table (S450).

If there is the opened wine whose storage expiration date is less than or equal to the predetermined reference date, the processor 180 may transmit a control signal to the output unit 150 so as to output a notification informing the user of the remaining storage days (S460).

The predetermined reference date may be a value set by a user or a developer. It may also include information stored in the cloud or memory 170. Hereinafter, details will be described with reference to FIG. 11.

Figure 11:
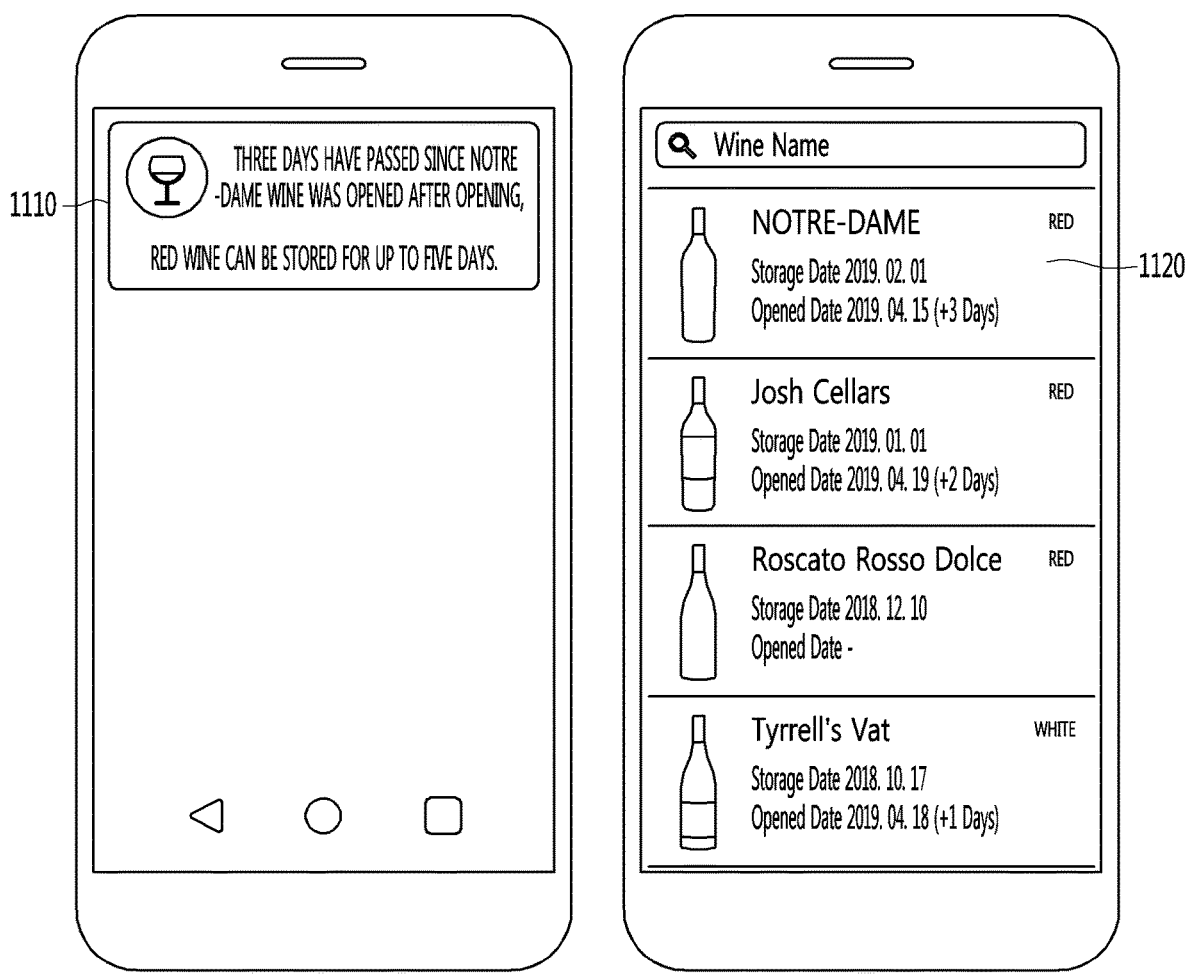
FIG. 11 is a diagram illustrating a display of a notification for an opened wine, whose expiration date is imminent, according to an embodiment of the present invention.

FIG. 11 is a diagram illustrating a display of a notification for an opened wine, whose expiration date is imminent, according to an embodiment of the present invention.

The output unit 150 may output the expiration date of the wine through the storage date and the opened date of the opened wine according to the control signal received from the processor 180.

For example, the name and the opened date of the corresponding wine and how many days have passed since the opening may be displayed at the upper end of the display unit 1110 of the output unit 150. In addition, the output unit 150 may output the wine list stored for each corresponding space. The wine list may display the name of the corresponding wine, the type of the wine, the storage date of the wine, and the opened date of the wine.

The display unit 1110 may display execution screen information of an application program running on the AI apparatus 100, or UI or graphic user interface (GUI) information according to the execution screen information.

The display unit 1110 may form a layer structure with a touch sensor, or may be integrally formed with the touch sensor, thereby implementing a touch screen. The touch screen may function as a user input unit 123 that provides an input interface between the AI apparatus 100 and the user, and may also provide an output interface between the AI apparatus 100 and the user.

Considering that, due to characteristics of wine, there are an optimal storage condition and an expiration date for each wine that is not kept refrigerated, and wine refrigerators are widely spread in general households rather than specialized stores, the optimal wine storage conditions are automatically set for each space of the wine refrigerator by using the artificial intelligence device installed in the wine refrigerator. Therefore, the user can enjoy the best taste of the wines at home, and it is possible to solve the inconvenience of having to have expertise in wine storage of each type.

The present invention may be embodied as computer-readable codes on a program-recorded medium. The computer-readable recording medium may be any recording medium that stores data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the terminal.

What is claimed is:

1. An artificial intelligence device mounted on a wine refrigerator including a plurality of divided spaces, the artificial intelligence device comprising: an input interface configured to acquire image data of wine bottles stored in the divided spaces, the image data including a label of each or at least one of the wine bottles; a processor configured to: acquire wine information of wine in the wine bottles by using an artificial intelligence model that receives the image data as an input value create a wine list table for each of the divided spaces based on the wine information, determine a plurality of groups of wine for each of the divided spaces based on a storage condition that includes a recommended storage temperature of wine, determine a main group among the plurality of groups of wine for each of the divided spaces, and set a temperature of each of the divided spaces set based on the storage condition corresponding to the main group; and an output interface configured to output a signal received from the processor.

2. The artificial intelligence device according to claim 1, wherein the artificial intelligence model includes a first artificial intelligence model that is a neural network whose weight is adjusted by training using the image data acquired by the input interface as an input value and the wine information as a result value.

3. The artificial intelligence device according to claim 1, wherein the wine information includes a name of a corresponding wine,
wherein the wine list table includes a storage space of the corresponding wine among the divided spaces, the name of the wine, a type of the wine, and the recommended storage temperature of the wine, and
wherein the storage condition further includes the type of the corresponding wine.

4. The artificial intelligence device according to claim 1, wherein the processor is configured to, based on determining that one of the divided spaces has a plurality of groups of wine according to the storage condition,
control the output interface to output a notification for moving a group of wine other than the main group to another space of the divided spaces.

5. The artificial intelligence device according to claim 1, wherein the main group has the largest number of wines among the plurality of groups of wine in each of the divided spaces.

6. The artificial intelligence device according to claim 1, wherein the processor is configured to:
determine that a first space among the divided spaces has one group of wine;
determine the one group as the main group; and set a temperature of the first space corresponding to the recommended storage temperature of the main group.

7. The artificial intelligence device according to claim 1, wherein the processor is configured to acquire opening information by using an artificial intelligence model that receives an image of a wine cap portion as an input value, the opening information indicating an opening state or a non-opening state of the wine bottles, and
wherein the wine list table further includes the opening information and an opened date of the wine bottles.

8. The artificial intelligence device according to claim 7, wherein the artificial intelligence model includes a second artificial intelligence model that is a neural network whose weight is adjusted by training using the image data acquired from the input interface as an input value and the opening information as a result value.

9. The artificial intelligence device according to claim 8, wherein the processor is configured to, based on the result value of the second artificial intelligence model corresponding to an opened wine, determine whether a storage expiration date of the wine in the wine list is less than or equal to a predetermined reference date by using information stored in the wine list table.

10. The artificial intelligence device according to claim 8, wherein the processor is configured to:
determine that the wine bottles include an opened wine bottle based on the opening information;
determine a storage expiration date of the opened wine bottle; and
based on the storage expiration date being less than or equal to a predetermined reference date, transmit a control signal to the output interface so as to output a notification informing a user of remaining storage days.

11. A method for an artificial intelligence device mounted on a wine refrigerator including a plurality of divided spaces, the method comprising: acquiring image data of wine bottles stored in the divided spaces, the image data including a label of each or at least one of the wine bottles: acquiring wine information by using an artificial intelligence model that receives the image data as an input value; creating a wine list table for each of the divided spaces based on the wine information; determining a plurality of groups of wine for each of the divided spaces based on a storage condition that includes a recommended storage temperature of wine; determining a main group among the plurality of groups of wine for each of the divided spaces; and setting a temperature of each of the divided spaces based on the storage condition corresponding to the main group.

12. A non-transitory recording medium having recorded thereon a program for performing operations for controlling a wine refrigerator including a plurality of divided spaces, the operations comprising: acquiring image data of wine bottles stored in the divided spaces, the image data including a label of each or at least one of the wine bottles; acquiring wine information by using an artificial intelligence model that receives the image data as an input value; creating a wine list table for each of the divided spaces based on the wine information; determining a plurality of groups of wine for each of the divided spaces based on a storage condition that includes a recommended storage temperature of wine; determining a main group among the plurality of groups of wine for each of the divided spaces; and setting a temperature of each of the divided spaces based on the storage condition corresponding to the main group.

13. The artificial intelligence device according to claim 1, wherein the processor is configured to:
determine a first group of wine stored in the divided spaces based on the storage condition, the first group of wine having a first recommended storage temperature;
determine a second group of wine stored in the divided spaces based on the storage condition, the second group of wine having a second recommended storage temperature that is different from the first recommended storage temperature;
set the first recommended storage temperature as a temperature of a first space among the divided spaces; and
set the second recommended storage temperature as a temperature of a second space among the divided spaces.

14. The artificial intelligence device according to claim 13, wherein the processor is configured to:
determine whether the first space includes a wine bottle corresponding to the second group of wine; and
based on determining that the first space includes the wine bottle corresponding to the second group of wine, output a notification for moving the wine bottle to the second space.

15. The method according to claim 11, wherein determining the plurality of groups of wine comprises: determining a first group of wine stored in the divided spaces based on the storage condition, the first group of wine having a first recommended storage temperature; and determining a second group of wine stored in the divided spaces based on the storage condition, the second group of wine having a second recommended storage temperature that is different from the first recommended storage temperature, and wherein setting the temperature of each of the divided spaces comprises: setting the first recommended storage temperature as a temperature of a first space among the divided spaces; and setting the second recommended storage temperature as a temperature of a second space among the divided spaces.

16. The method according to claim 15, further comprising:
determining whether the first space includes a wine bottle corresponding to the second group of wine; and
based on determining that the first space includes the wine bottle corresponding to the second group of wine, outputting a notification for moving the wine bottle to the second space.

17. The non-transitory recording medium according to claim 12, wherein determining the plurality of groups of wine comprises: determining a first group of wine stored in the divided spaces based on the storage condition, the first group of wine having a first recommended storage temperature; and determining a second group of wine stored in the divided spaces based on the storage condition, the second group of wine having a second recommended storage temperature that is different from the first recommended storage temperature, and wherein setting the temperature of each of the divided spaces comprises: setting the first recommended storage temperature as a temperature of a first space among the divided spaces, and setting the second recommended storage temperature as a temperature of a second space among the divided spaces.

18. The non-transitory recording medium according to claim 17, wherein the operations further comprise:
determining whether the first space includes a wine bottle corresponding to the second group of wine; and
based on determining that the first space includes the wine bottle corresponding to the second group of wine, outputting a notification for moving the wine bottle to the second space.

* * * * *